US010770890B2

(12) United States Patent
DeLay et al.

(10) Patent No.: US 10,770,890 B2
(45) Date of Patent: Sep. 8, 2020

(54) MODULAR ACCESS CONNECTION SYSTEM

(71) Applicant: COMTEST NETWORKS INC., Ottawa (CA)

(72) Inventors: Shawn M. DeLay, Nepean (CA); Roderick A. Farrell, Ottawa (CA); Savo Todoric, Nepean (CA); Russell D. Adams, Jackson, WY (US); David Bain, Ottawa (CA); Anna Malenica, Ottawa (CA); William Fry, Mallorytown (CA)

(73) Assignee: COMTEST NETWORKS INC., Ottawa (CA)

( * ) Notice: Subject to any disclaimer, the term of this patent is extended or adjusted under 35 U.S.C. 154(b) by 0 days.

(21) Appl. No.: 15/706,270

(22) Filed: Sep. 15, 2017

(65) Prior Publication Data

US 2018/0301897 A1    Oct. 18, 2018

Related U.S. Application Data

(60) Provisional application No. 62/486,239, filed on Apr. 17, 2017.

(51) Int. Cl.
| | |
|---|---|
| *H02H 9/04* | (2006.01) |
| *H04Q 1/02* | (2006.01) |
| *H01R 12/72* | (2011.01) |
| *H04M 7/00* | (2006.01) |
| *H04Q 1/14* | (2006.01) |
| *H01R 25/00* | (2006.01) |
| *H01R 13/648* | (2006.01) |
| *H01R 9/24* | (2006.01) |
| *H01R 31/06* | (2006.01) |

(52) U.S. Cl.
CPC ............. *H02H 9/04* (2013.01); *H01R 12/724* (2013.01); *H04M 7/0066* (2013.01); *H04Q 1/13* (2013.01); *H04Q 1/14* (2013.01); *H01R 9/24* (2013.01); *H01R 12/722* (2013.01); *H01R 13/6485* (2013.01); *H01R 25/006* (2013.01); *H01R 31/06* (2013.01)

(58) Field of Classification Search
CPC ......... H01T 4/06; H01R 13/6666; H02H 9/04
USPC ........... 439/620.06, 620.08, 620.26; 361/119
See application file for complete search history.

(56) References Cited

U.S. PATENT DOCUMENTS

| | | | | |
|---|---|---|---|---|
| 5,175,662 A | * | 12/1992 | DeBalko | ................... H01T 4/06 361/119 |
| 5,177,782 A | * | 1/1993 | Henderson | ......... H01R 13/6666 379/412 |
| 6,222,717 B1 | * | 4/2001 | Waas | ................... H01R 4/2433 361/119 |

(Continued)

*Primary Examiner* — Abdullah A Riyami
*Assistant Examiner* — Marcus E Harcum
(74) *Attorney, Agent, or Firm* — Pearne & Gordon LLP

(57) ABSTRACT

An interface panel comprising a respective socket for each local loop connection between a main distribution frame and a demarcation point, the socket comprising: a pair of first ports configured for connection to a respective wire pair extending from the interface panel to the main distribution frame; a pair of second ports configured for connection to a respective wire pair extending from the interface panel to the demarcation point; and a pair of third ports configured for connection to a respective wire pair extending from the interface panel to a Digital Subscriber Line Access Multiplexer (DSLAM).

3 Claims, 12 Drawing Sheets

(56) References Cited

U.S. PATENT DOCUMENTS

| | | | | |
|---|---|---|---|---|
| 6,266,223 B1* | 7/2001 | Curry | ............... | H02H 9/042 |
| | | | | 361/119 |
| 7,778,003 B2* | 8/2010 | Metral | ............... | H01T 4/06 |
| | | | | 361/119 |
| 2004/0037021 A1* | 2/2004 | Heidorn | ............... | H04M 3/18 |
| | | | | 361/119 |
| 2013/0242440 A1* | 9/2013 | Bonasia | ............... | H02H 3/33 |
| | | | | 361/49 |
| 2014/0073199 A1* | 3/2014 | Busse | ............... | H01R 13/6666 |
| | | | | 439/686 |
| 2015/0004845 A1* | 1/2015 | Barrefelt | ............... | H01R 13/504 |
| | | | | 439/626 |

* cited by examiner

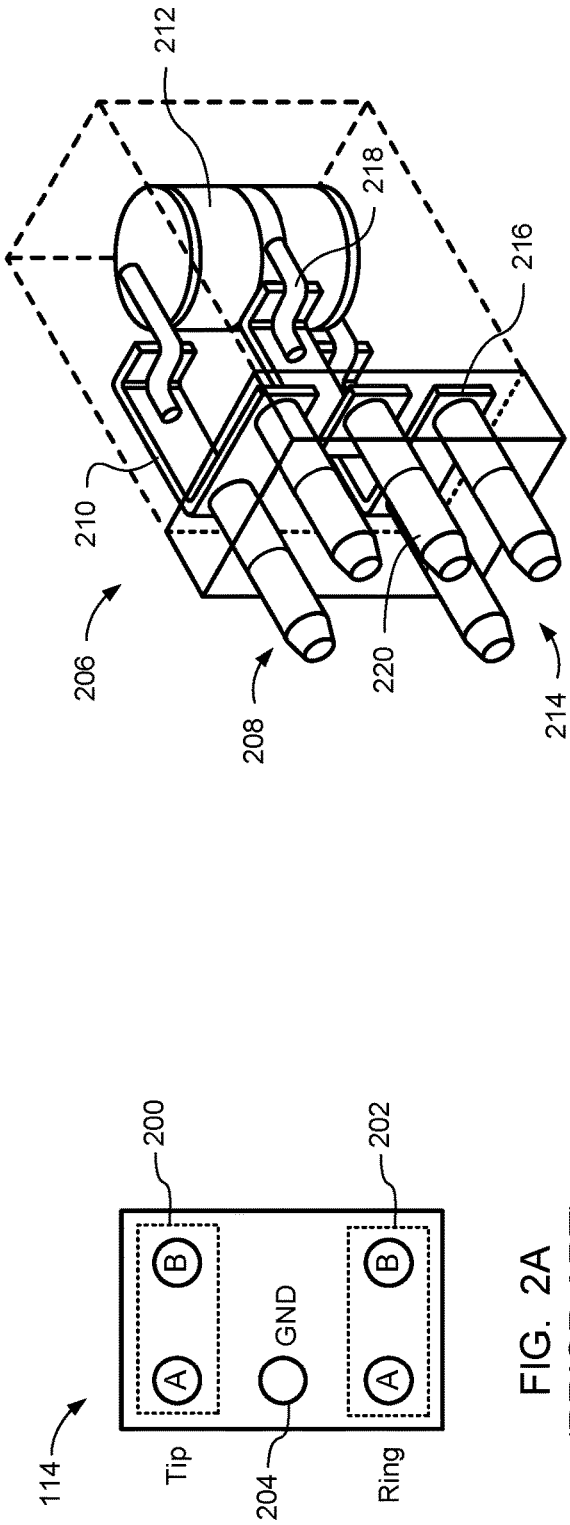
FIG. 2B (PRIOR ART)
FIG. 2A (PRIOR ART)
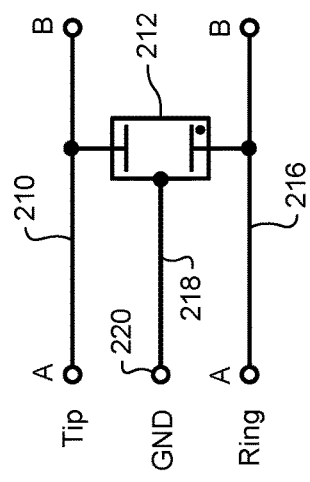
FIG. 2C (PRIOR ART)

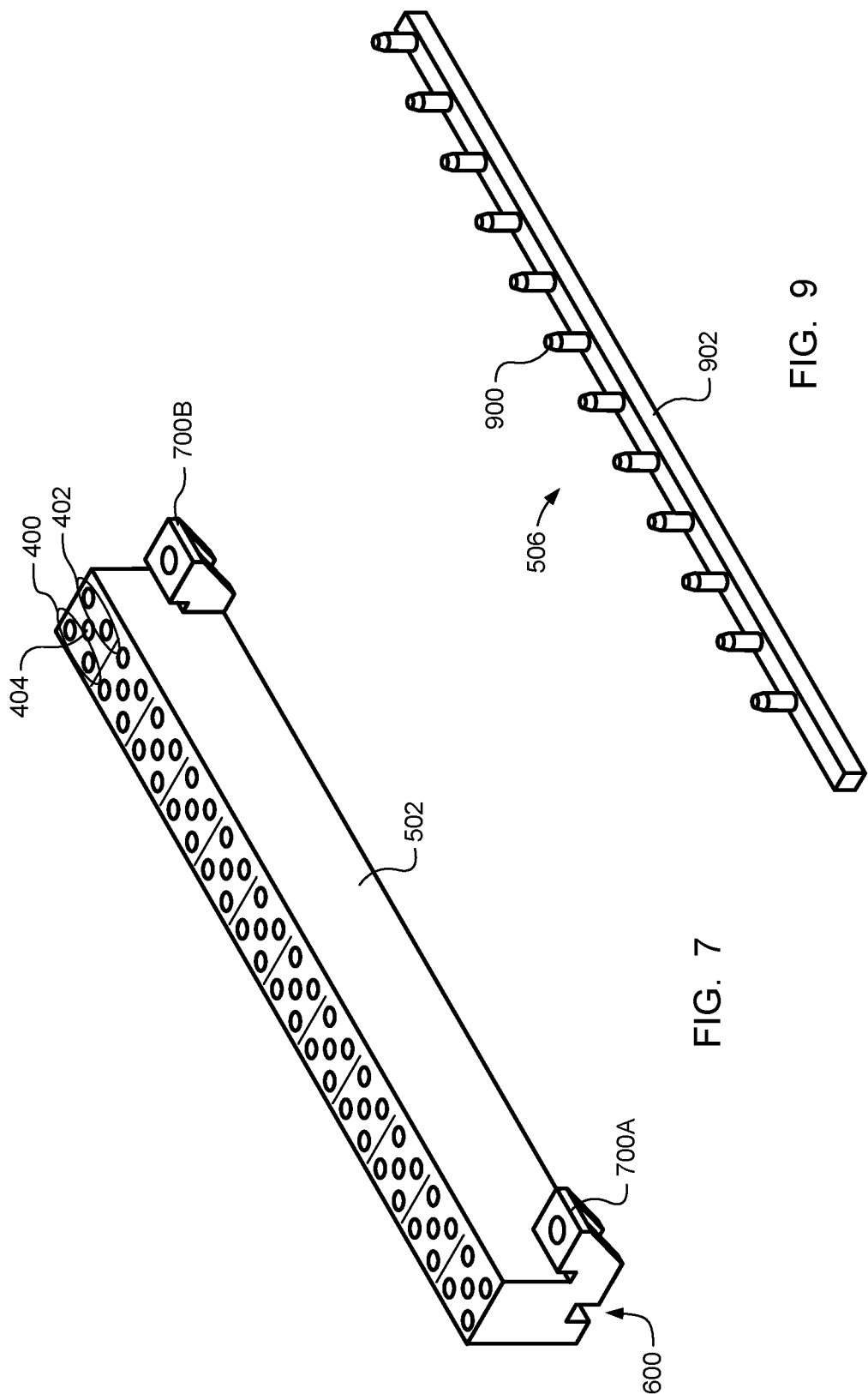

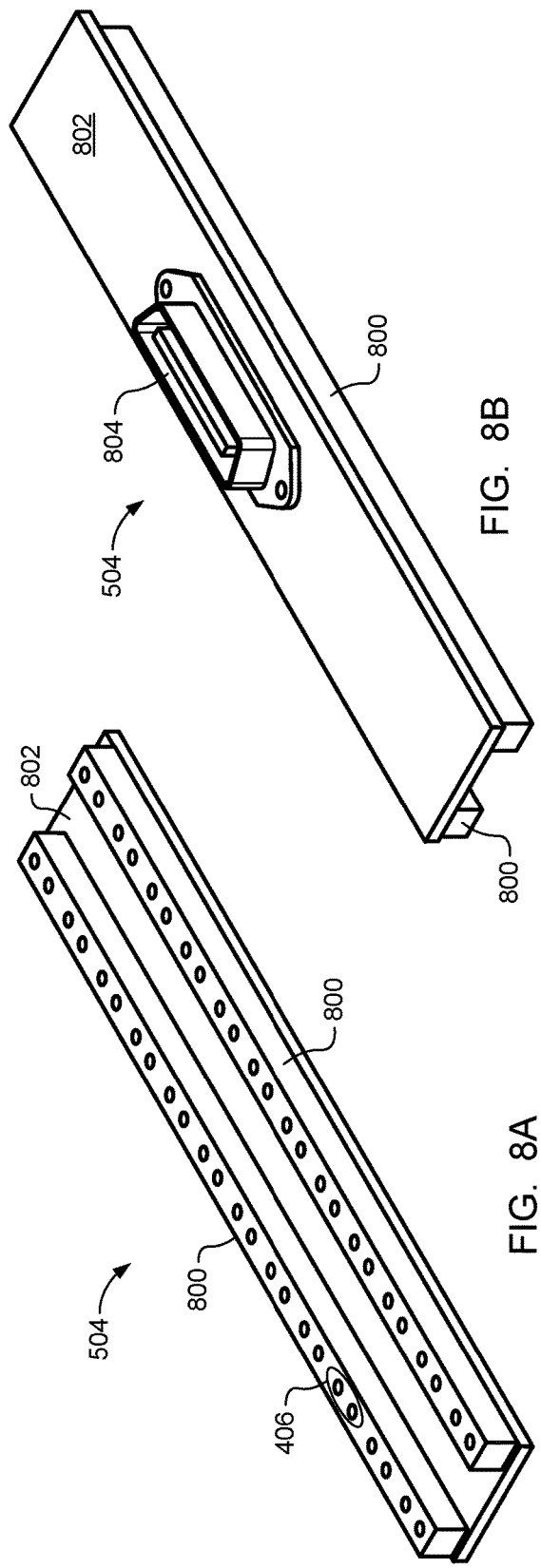
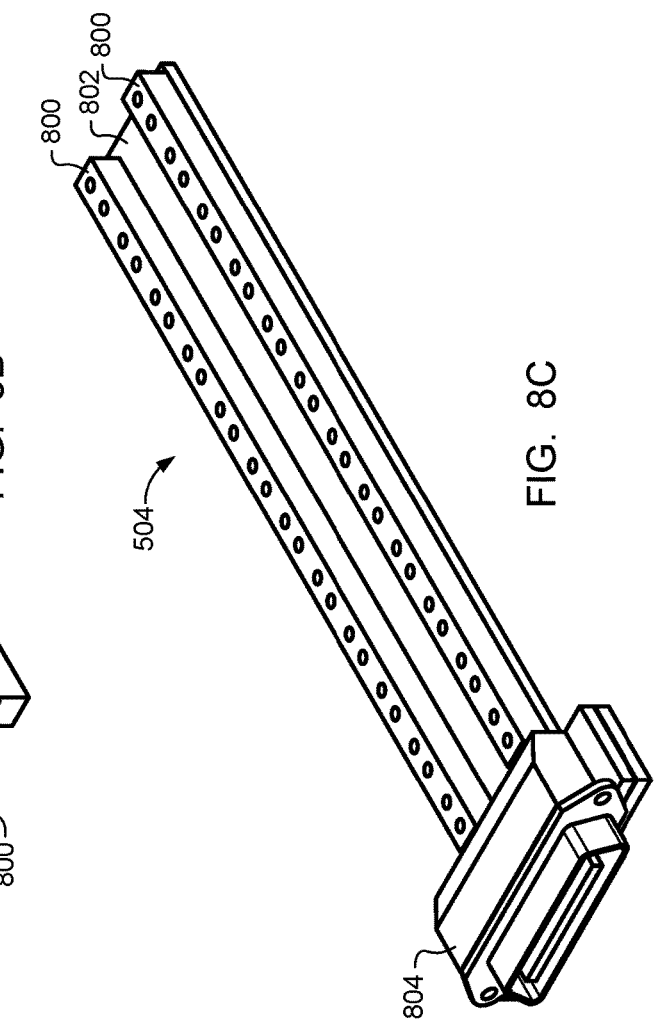
FIG. 8A
FIG. 8B
FIG. 8C

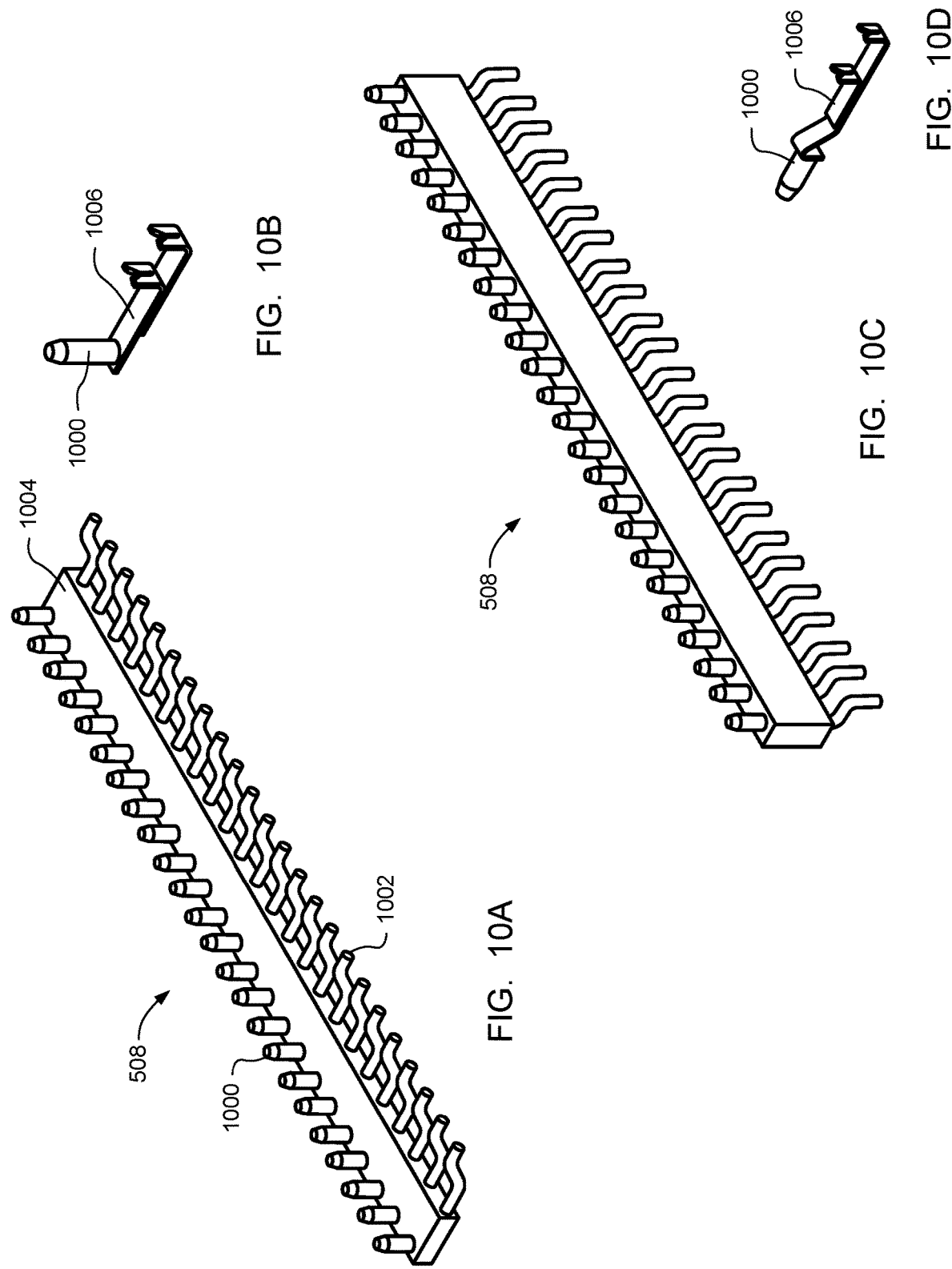

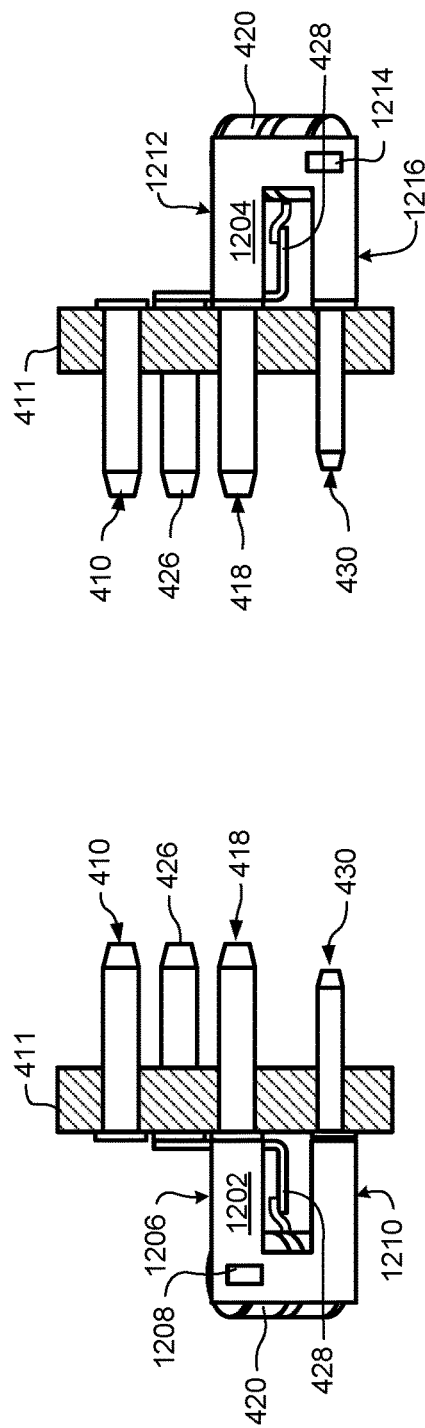
FIG. 12A
FIG. 12B
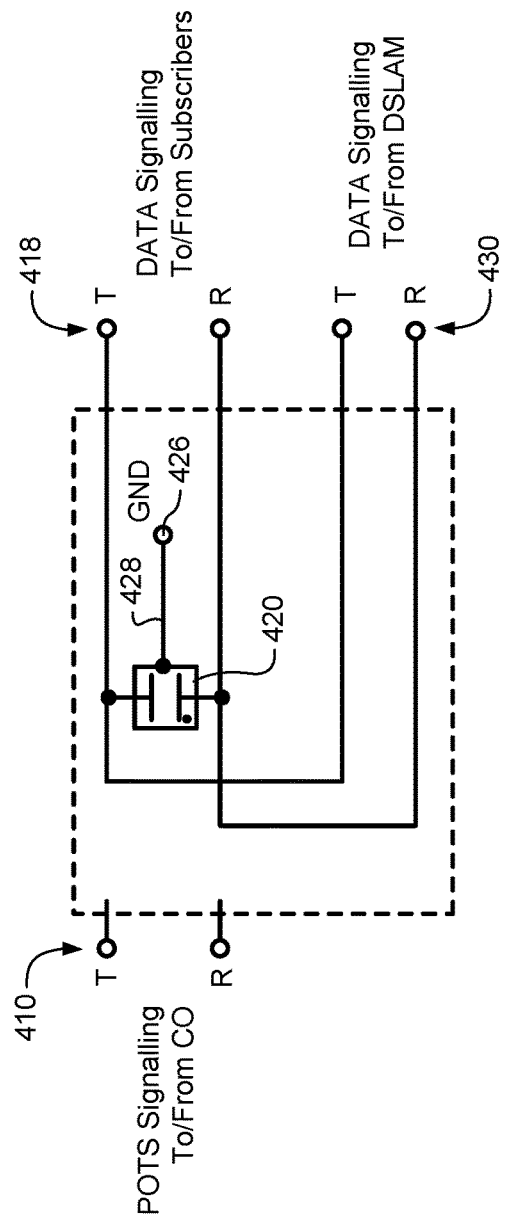
FIG. 12C

MODULAR ACCESS CONNECTION SYSTEM

CROSS-REFERENCE TO RELATED APPLICATIONS

This application is based on, and claims benefit of, U.S. Provisional Patent Application No. 62/486,238 filed Apr. 20, 2017, the entire content of which is incorporated herein by reference.

FIELD OF THE INVENTION

The present invention pertains to the field of communications, and in particular to a Modular Access Connection system.

BACKGROUND

In conventional communications networks, voice and data communications services are commonly provided to customer premises via so-called "local loop" connections between a main distribution frame located at a Central Office and a respective demarcation point at each customer premise. A local loop is normally constructed as a pair of copper wires (commonly referred to as "tip" and "ring", respectively), which may be either twisted together or flat untwisted. Copper wire local loops are commonly used to carry both voice communications (i.e. "Plain Old Telephone Service", POTS) and data signals using Digital Subscriber Line (DSL) and its successors, for example.

In order to provide data services through the local loop, it is common practice to install a distribution frame or Serving Area Interface (SAI) of the type illustrated in FIG. 1. The SAI may be installed at a Central Office or in a cabinet between the Central Office and a plurality of customer premises. As may be seen in FIG. 1, the SAI 100 generally comprises a PSTN interface panel 102; a Line interface panel 104; a Digital Subscriber Line Access Multiplexer (DSLAM) 106; a splitter 108 connected to the DSLAM 106 via a plurality of DSL ports 110 and each of the PSTN and Line interface panels 102, 104, and a power supply module 112.

The PSTN interface panel 102 is configured to support POTS signalling to and from the main distribution frame (not shown) and to protect the splitter 108 and DSLAM 106 from over-voltage surges due to lightning, for example. The PSTN interface panel 102 comprises a plurality of sockets 114, each of which is connected to a respective PSTN wire pair 116 extending between the SAI 100 and the main distribution frame. A respective pair of jumper wires 118 is provided for connecting each socket 114 to the splitter 108. Similarly, the Line interface panel 104 is configured to support signalling to and from equipment at a customers' premises. The Line interface panel 104 also comprises a plurality of sockets 120, each of which is connected to a respective wire pair 122 extending between the SAI 100 and a demarcation point (not shown) at a customer premise. A respective pair of jumper wires 124 is provided for connecting each socket 120 of the Line interface panel 104 to the splitter 108.

With the arrangement of FIG. 1, the splitter 108 provides a signal path for POTS signalling between a respective pair of sockets 114, 120 on the PSTN and Line interface panels 102, 104 (and so between the main distribution frame and customer premised equipment), and also provides a connection for data service signalling between the DSL ports 110 and appropriate sockets 120 on the Line interface panel 104 (and so between the DSLAM 106 and a customer premised modem).

FIG. 2A illustrates a socket 114 of the type commonly used in the PSTN interface panel 102. As may be seen in FIG. 2A, the socket 114 comprises a pair of ports 200, 202 (labeled as "A" and "B") associated with each of the tip and ring wires, and a ground port 204 which may be connected to a ground bus bar (not shown). For example, the "A" ports may respectively be connected (usually by conventional wire wrapping techniques) to tip and ring wires 116 extending outside the SAI 100 (i.e. to the main distribution frame), and the "B" ports may respectively be connected to tip and ring jumper wires 118 (usually by conventional wire wrapping techniques) extending between the socket 114 and the splitter 108. Typically, the sockets 120 of the Line interface panel 104 will be identical to the sockets 114 of the PSTN interface panel 102. Similarly, the "A" ports of sockets 120 may be connected (e.g. by conventional wire wrapping techniques) to tip and ring wires 122 extending outside the SAI 100 (i.e. to the demarcation point at the customer premise), and the "B" ports may be connected to tip and ring jumper wires 124 (e.g. by conventional wire wrapping techniques) extending between the socket 1120 and the splitter 108.

Referring to FIG. 2B, there is shown a primary protection plug 206 which is configured to complete the connection path between the tip and ring "A" and "B" ports while at the same time providing protection against over-voltage surges due to lightning strikes, for example. Thus, in the example of FIG. 2B, the plug 206 includes a first pair of pins 208 connected to a respective metal contact 210 that connects the tip wire "A" and "B" ports 200 to each other and to a surge arrestor 212 such as a Gas Discharge Tube (GDT). A second pair of pins 214 are connected to a respective metal contact 216 that connects the ring wire "A" and "B" ports 202 to each other and to the surge arrestor 212. A third metal contact 218 extends between the surge arrestor 212 and a ground pin 220 configured to insert into the ground port 204 of the socket 114, and so provides an electrical path to ground for surge currents. FIG. 2C schematically illustrates the electrical connections within the plug 206. It will be seen that inserting the plug 206 into the socket 114 completes the connection between the "A" and "B" ports and so between the tip and ring wires of a respective wire pairs 116 118 extending outside the SAI 100 (i.e. to the main distribution frame) and to the splitter 108, while at the same time protecting the splitter 108 and DSLAM 106 from over-voltage surges due to lightning strikes, for example.

In the North American market, the socket and protection plug are required to provide surge protection. The characteristics of the power surges (such as peak current, peak voltage and duration) are specified in published specifications, including:

Underwriters Laboratories UL 497, Standard for Safety for Protectors for Paired-Conductor Communications Circuits;

Telcordia GR-974-CORE, Generic Requirements for Telecommunications Line Protector Units (TLPUs);

Telcordia GR-2916-CORE, Generic Requirements for a 5 Pin Protector Block Assembly; and Telcordia GR-1089-CORE, EMC and Electrical Safety—Generic Criteria for Network Telecommunications Equipment.

Successor specifications are expected to be published in the future and will contain the same or updated power surge characteristics. Importantly, the power surge characteristics defined in these specifications exceed the limits of connectors and devices commonly used in electronic devices. This is the primary reason for the use of wire-wrap connections and Gas Discharge Tube surge arrestor devices 212 in the sockets 114 and primary protection plugs 206 described above.

Low-cost techniques for simplifying wiring within the SAI 100 and for supporting an increased number of connections in an SAI 100 of a given size would be desirable. More broadly, low-cost techniques for interconnecting wire-pair communications lines while providing surge protection in accordance with North American standards, would be desirable.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a modular access system.

Accordingly, an aspect of the present invention provides an interface panel. The interface panel comprises a respective socket for each local loop connection between a main distribution frame and a demarcation point. The socket comprises: a pair of first ports configured for connection to a respective wire pair extending from the interface panel to the main distribution frame; a pair of second ports configured for connection to a respective wire pair extending from the interface panel to the demarcation point; and a pair of third ports configured for connection to a respective wire pair extending from the interface panel to a Digital Subscriber Line Access Multiplexer (DSLAM) associated with the Serving Area Interface.

A further aspect of the present invention provides a Serving Area Interface (SAI) comprising an interface panel that includes a respective socket for each local loop connection between a main distribution frame and a demarcation point. The socket comprises: a pair of first ports configured for connection to a respective wire pair extending from the interface panel to the main distribution frame; a pair of second ports configured for connection to a respective wire pair extending from the interface panel to the demarcation point; and a pair of third ports configured for connection to a respective wire pair extending from the interface panel to a Digital Subscriber Line Access Multiplexer (DSLAM) associated with the Serving Area Interface.

A further aspect of the present invention provides an interface module for use in an interface panel. The interface module comprises: a module frame including at least one circuit header on a base interface block and a DSL interface block. The circuit header on the base interface block includes a pair of first ports configured for connection to a respective wire pair extending from the Serving Area Interface to a main distribution frame, and a pair of second ports configured for connection to a respective wire pair extending from the Serving Area Interface to a demarcation point. The circuit header on the DSL interface block comprises: at least one DATA header associated with a respective circuit header on the base interface block, the DATA header being operatively mounted on a Printed Circuit Board (PCB) such that the DATA header is located adjacent the respective base interface circuit header and including a pair of third ports; a connector comprising a plurality of contacts configured for connection to data ports of a Digital Subscriber Line Access Multiplexer (DSLAM) associated with the Serving Area Interface; and a respective pair of circuit traces extending from the pair of third ports to respective contacts of the connector.

A further aspect of the present invention provides a plug-in module for use in an interface panel. The plug-in module comprises: a pair of first contacts configured for connection to a respective wire pair extending from the interface panel to a main distribution frame; a pair of second contacts configured for connection to a respective wire pair extending from the interface panel to a demarcation point; a pair of third contacts configured for connection to a respective wire pair extending from the interface panel to a Digital Subscriber Line Access Multiplexer (DSLAM) associated with the Serving Area Interface; a first surge arrester associated with the pair of first contacts, and a second surge arrester associated with the pair of second contacts; and a Printed Circuit Board (PCB) comprising: circuit traces connecting respective ones of the pair of first contacts, pair of second contacts and pair of third contacts together; and a low-pass filter configured to isolate Data services signaling from the pair of first contacts.

BRIEF DESCRIPTION OF THE FIGURES

Further features and advantages of the present invention will become apparent from the following detailed description, taken in combination with the appended drawings, in which:

FIGS. 2A-2C schematically illustrate elements a socket of the connection panel of FIG. 1 and a protection plug insertable in the socket;

FIG. 7 illustrates an example base interface block usable in the interface module of FIG. 5;

FIGS. 8A-8C illustrate respective example data interface blocks usable in the interface module of FIG. 5;

FIG. 9 illustrates an example ground bar usable in the interface module of FIG. 5; and FIGS. 10A and 10D illustrate respective two alternative example connector modules usable in the interface module of FIG. 5;

FIGS. 12A-12C schematically illustrate elements of a plug-in module insertable in the socket of FIG. 4A, in accordance with a further representative embodiment.

It will be noted that throughout the appended drawings, like features are identified by like reference numerals.

DETAILED DESCRIPTION

In accordance with the present invention, a modular access connection system is provided. For the purposes of description, elements of the present invention are described by way of example embodiments that may be used in a Serving Area Interface (SAI) 300 of the type illustrated in FIG. 3. However, it will be appreciated that the present invention is not limited to Serving Area Interfaces. Rather, elements of the present invention may be used, alone or in and suitable combination, in any communications system in which it is desired to provide selective connectivity between signal lines, with optional surge protection and signal processing functions.

Figure 1:
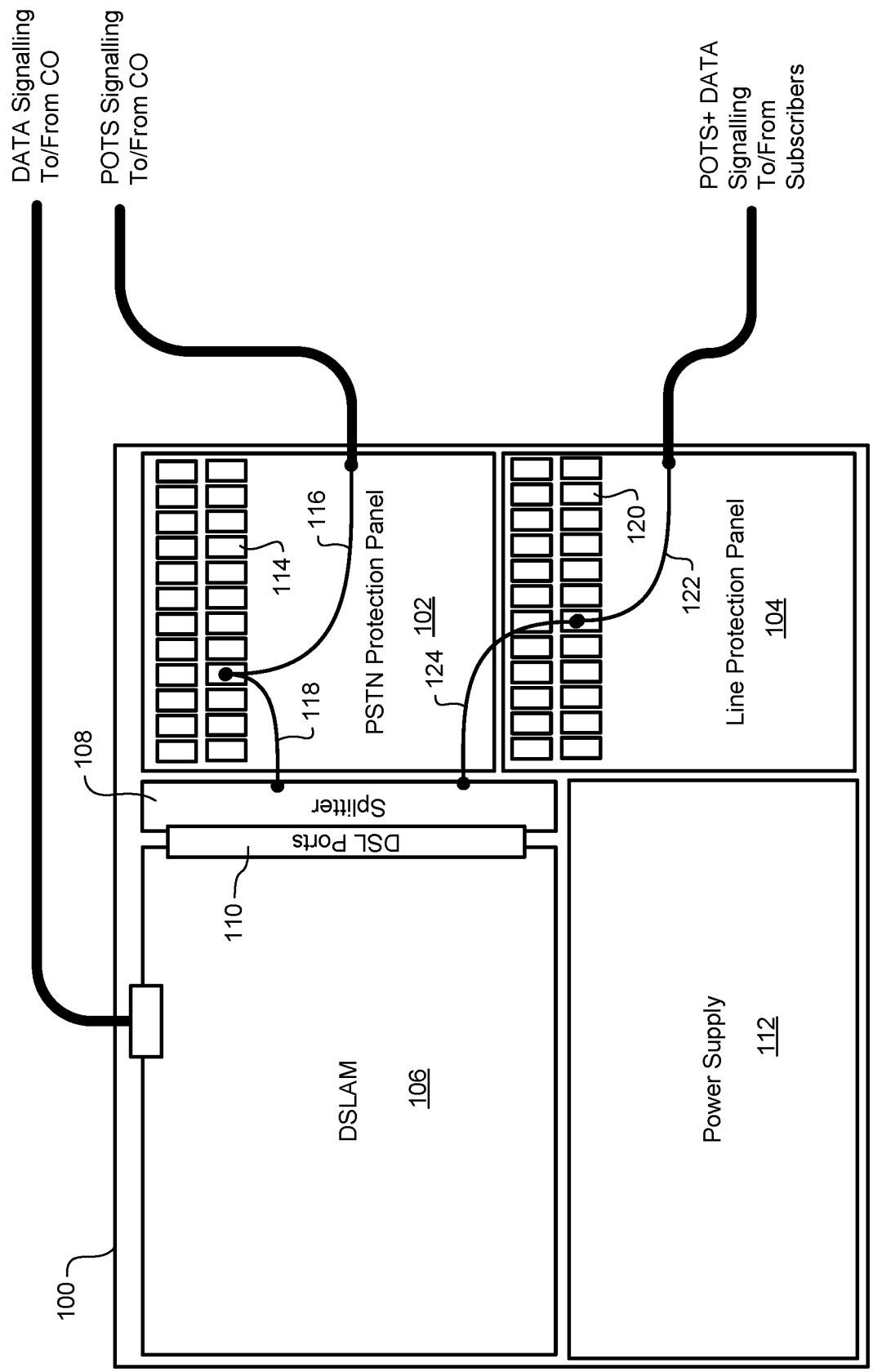
FIG. 1 schematically illustrates a connection panel known in the art.
Figure 3:
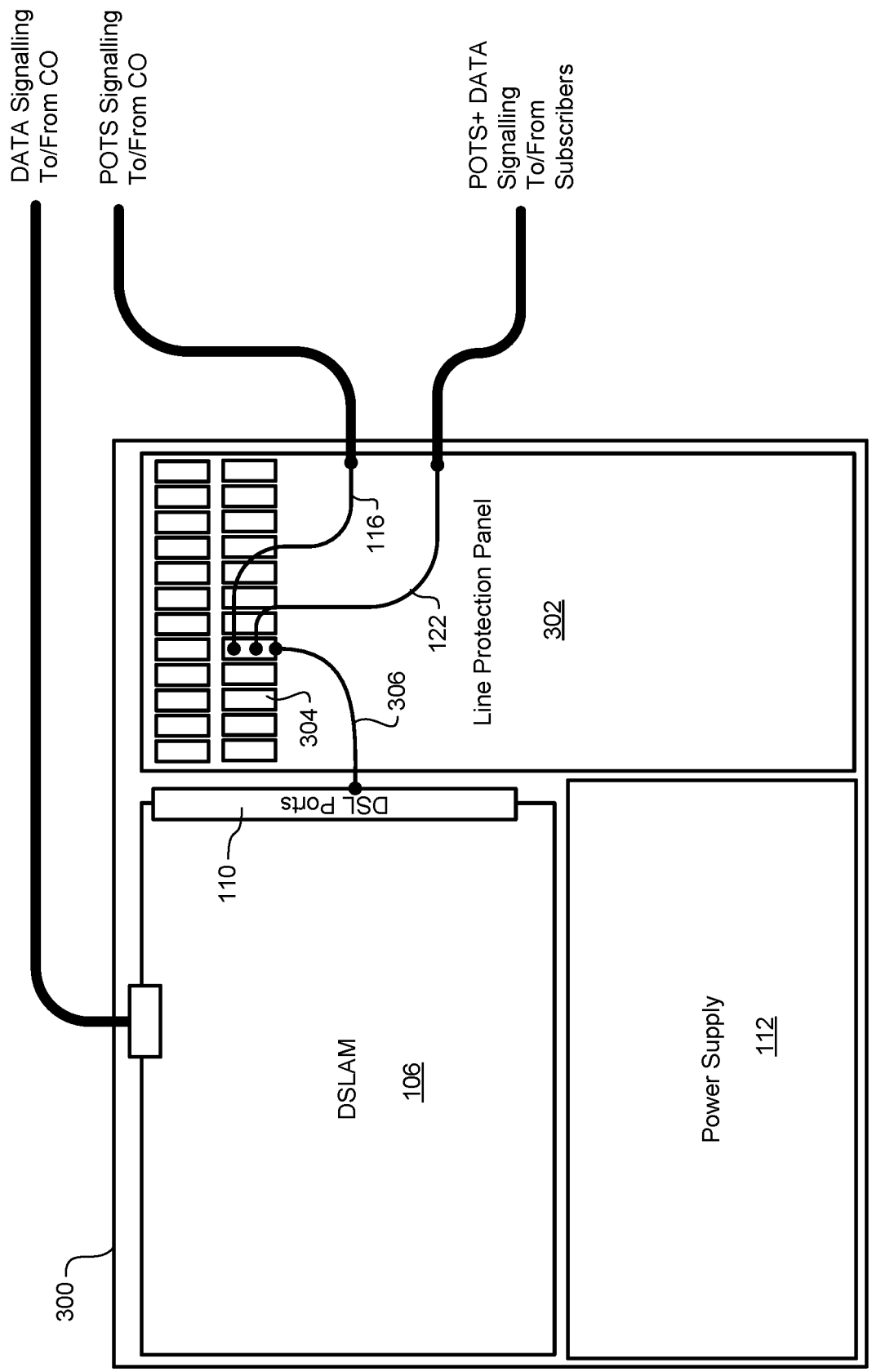
FIG. 3 schematically illustrates a connection panel in accordance with a representative embodiment.

FIG. 3 illustrates an example Serving Area Interface (SAI) 300 in accordance with embodiments of the present invention, in which the conventional PSTN interface panel 102, Line interface panel 104, and splitter 108 are replaced by an integrated interface panel 302 and plug-in modules, which are illustrated in greater detail in FIGS. 4-12.

As may be seen in FIG. 3, the SAI 300 comprises a power supply 112, a Digital Subscriber Line Access Multiplexer (DSLAM) 106, and an integrated interface panel 302. The power supply 112 and DSLAM 106 may be configured to operate in a conventional manner. The integrated interface panel 302 comprises a plurality of sockets 304, each of which is associated with a respective one local loop connection between the main distribution frame located at the Central Office and a specific demarcation point at each customer premise. Thus, as may be seen in FIG. 3, each socket 304 may be connected via a jumper wire pair 306 to a data port 110 of the DSLAM 106, a PSTN wire pair 116 extending from the SAI 300 to the main distribution frame, and a line wire pair 122 extending from the SAI 300 to the demarcation point at the customer premise.

Figure 4B:
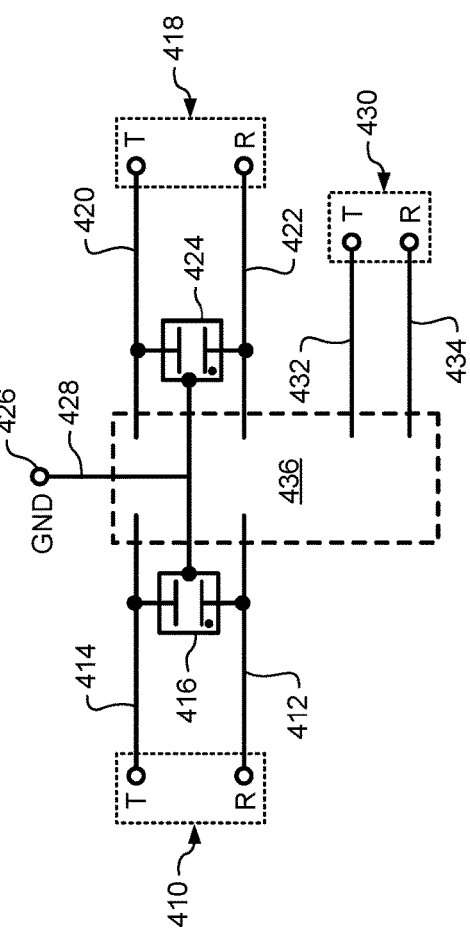
FIG. 4A schematically illustrates elements of a socket usable in the connection panel of FIG. 3, and FIGS. 4B-4F schematically illustrate elements of a plug-in module insertable in the socket, in accordance with a representative embodiment; t.
Figure 4C:
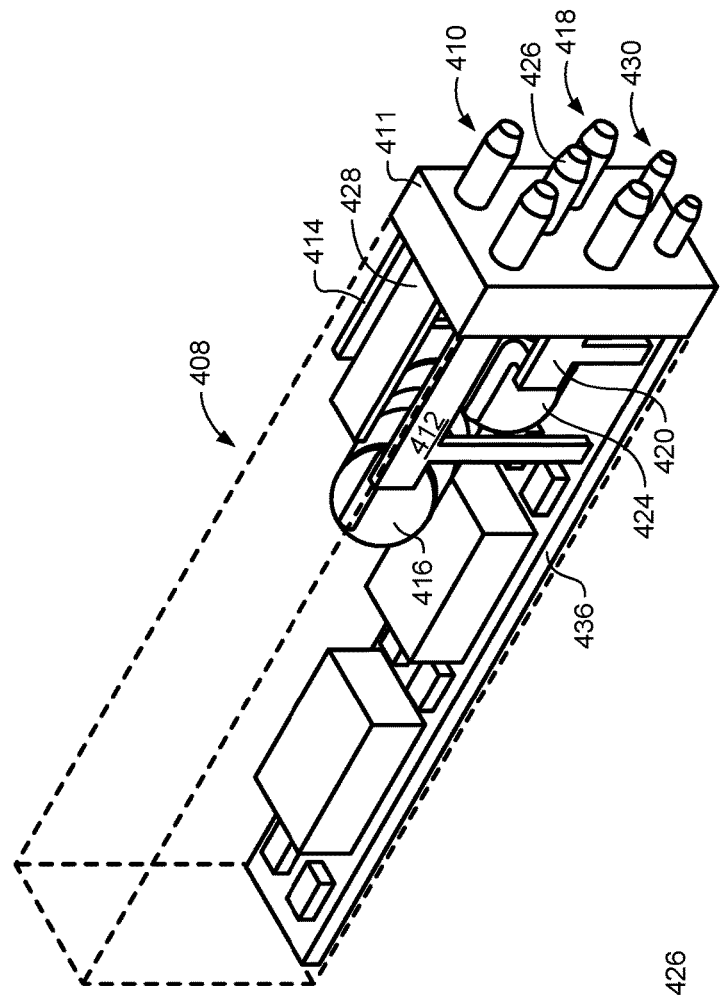
Figure 4A:
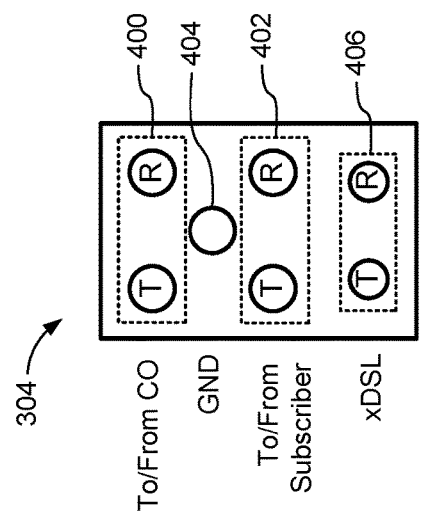

FIG. 4A illustrates an example socket 304 usable in the integrated interface panel 302 of FIG. 3. As may be seen in FIG. 4A, the socket 304 comprises a pair of PSTN ports 400 (labeled as "T" and "R") which may be connected to the PSTN wire pair 116; a pair of Line ports 402 (labeled as "T" and "R") which may be connected to the Line wire pair 122; a ground port 404 which may be connected to a ground bus bar (not shown); and a pair of data (xDSL) ports 406 (also labeled as "T" and "R") which may be connected to a corresponding jumper wire pair 306 to a data port 110 of the DSLAM 106.

Referring to FIG. 4B, there is shown an example plug-in module 408 which is configured to complete the connection paths between the PSTN, Line, and data wire pairs 116, 122, 306 while providing surge protection in accordance with North American standards, which may include any one or more of: Underwriters Laboratories UL 497, Standard for Safety for Protectors for Paired-Conductor Communications Circuits; Telcordia GR-974-CORE, Generic Requirements for Telecommunications Line Protector Units (TLPUs); Telcordia GR-2916-CORE, Generic Requirements for a 5 Pin Protector Block Assembly; Telcordia GR-1089-CORE, EMC and Electrical Safety—Generic Criteria for Network Telecommunications Equipment, and their successors.

In the example of FIGS. 4B and 4C, the plug-in module 408 includes a pair of PSTN pins 410 mounted in a support block 411 and connected to respective metal contacts 412 and 414 connecting the tip and ring ports 400 associated with the PSTN wire pair 116 to a respective surge arrestor 416 such as a Gas Discharge Tube (GDT). A pair of Line pins 418 are mounted in the support block 411 and connected to respective metal contacts 420 and 422 (see also FIG. 4C) that connect the tip and ring ports 402 associated with the Line wire pair 122 to a respective surge arrestor 424 such as a Gas Discharge Tube (GDT). A ground pin 426 is mounted in the support block 411 and connected to a corresponding ground contact 428 that extends to the surge arrestors 416 and 424, and so provides an electrical path to ground for surge currents via ground port 404. A pair of Data pins 430 are mounted in the support block 411 and connected to respective metal contacts 432 and 434 (FIG. 4C) that connect the data (xDSL) ports 406 to circuit traces (not shown) on a Printed Circuit Board (PCB) 436. The metal contacts 412,414, 420 and 422 connected to the pins 410, 418 associated with the PSTN and Line wire pairs 116, 122 are further connected to circuit traces (not shown) on the Printed Circuit Board (PCB) 436, while the ground contact 428 may be connected to a ground plane of the PCB) 436.

Figures 4D, 4E:
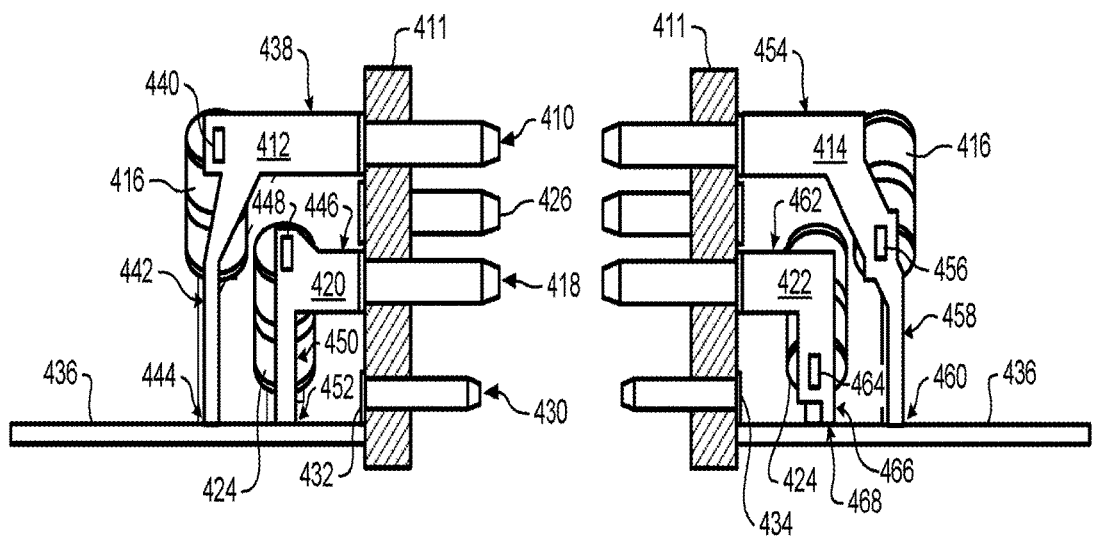

FIGS. 4D and 4E show respective left and right side views of the plug-in module 408. As may be seen in FIGS. 4D and 4E, each of the metal contacts 412,414, 420 and 422 may conveniently be provided as substantially L-shaped member having a pair of legs. For example, metal contact 412 includes a respective first (high-current) leg 438 extending between a mounting point 440 for surge arrester 416 and a respective one of the pair of PSTN pins 410, and a respective second (low-current) leg 442 extending between the mounting point 440 and a contact point 444 on the PCB 436. Similarly, metal contact 420 includes a respective first (high-current) leg 446 extending between a mounting point 448 for surge arrester 424 and a respective one of the pair of Line pins 418, and a respective second (low-current) leg 450 extending between the mounting point 448 and a contact point 452 on the PCB 436.

Referring to FIG. 4E, metal contact 414 includes a respective first (high-current) leg 454 extending between a mounting point 456 for surge arrester 416 and a respective one of the pair of PSTN pins 410, and a respective second (low-current) leg 458 extending between the mounting point 456 and a contact point 460 on the PCB 436. Similarly, metal contact 422 includes a respective first (high-current) leg 462 extending between a mounting point 464 for surge arrester 424 and a respective one of the pair of Line pins 418, and a respective second (low-current) leg 466 extending between the mounting point 464 and a contact point 468 on the PCB 436.

The Printed Circuit Board (PCB) 436 may comprise any desired circuit traces (not shown) to establish circuit connections between the contact points 444, 452, 460, 468 and the respective metal contacts 432 and 434 connected to the pair of Data pins 430. In addition, the Printed Circuit Board (PCB) 436 may comprise electronic elements configured to implement desired signal processing functions. For example, in a simple "pass-through" embodiment, the PCB 436 may comprise circuit traces defining direct connections between the contact points 444 and 452, and between the contact points 460 and 468. This arrangement electrically connects the Tip and Ring wires of the PSTN wire pair 116 to the corresponding wires of the Line wire pair 122, thereby enabling POTS signalling between the distribution frame and the customer premise. In such embodiments, the PCB 436 may not include any circuit traces connecting to the metal contacts 432 and 434, in which case the plug-in module 408 may not support data signalling. In other embodiments, the PCB 436 may comprise circuit traces and electronic devices configured to implement a signal combiner/splitter, as described in greater detail below with reference to FIG. 4F.

An advantage of the arrangement of FIGS. 4A-4E is that the metal contacts 412,414, 420 and 422 provide physical support for the surge arresters 416 and 424 and electrical signal paths between the pins 410 and 418 and the PCB 436. The high-current legs 438, 446, 454 and 462 may be sufficiently robust to withstand the surge currents specified by the above noted North American standards, while positioning of the mounting points 440, 448, 456, 464 between the high-current legs 438, 446, 454 and 462 and the low current legs 442, 450, 458 and 466 effectively protects the PCB 436 from surge currents and voltages.

Figure 4F:
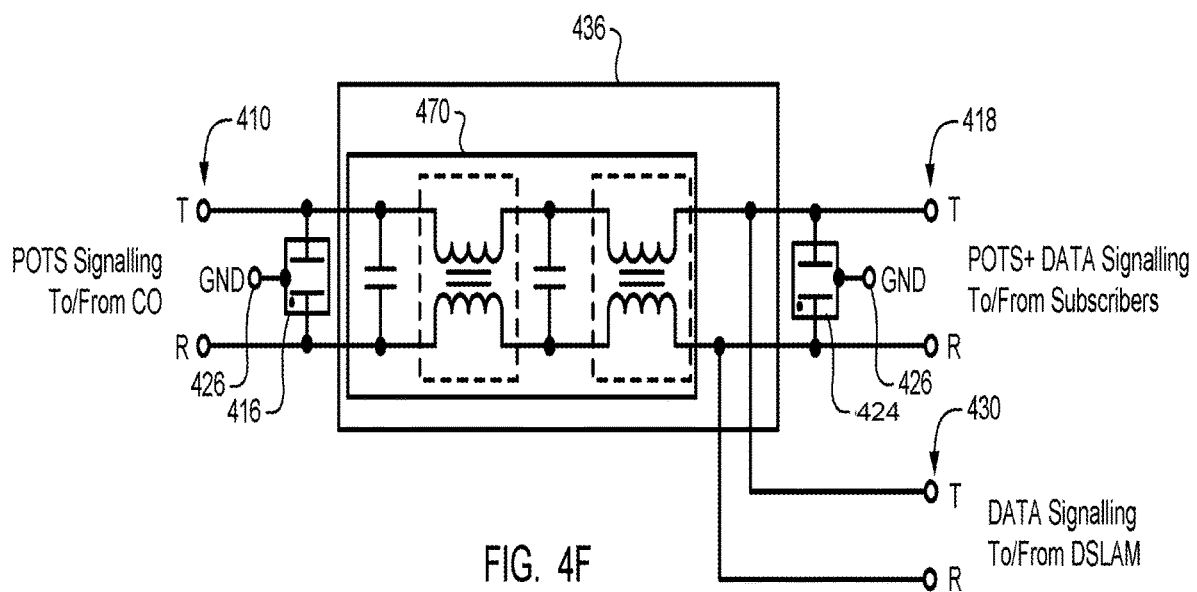

FIG. 4F schematically illustrates the electrical connections within an example plug-in module 408 configured as an integrated protection/splitter plug. As may be seen in FIG. 4F, the contact points 452, 468 associated with the line wire pins 418 are directly connected to the metal contacts 432 and 434 associated with the data pins 430, while circuit traces and electronic devices are configured to implement a low pass filter 470 that is connected between the contact points 452, 468 and the contact points 444, 460 associated with the PSTN wire pins 410. It will be seen that inserting the plug-in module 408 into the socket 304 simultaneously performs the functions of:

completing the connections between the PSTN and Line wire pairs 116 and 122, and therefore enabling POTS signalling between the main distribution frame and the demarcation point at the customer premise;

completing the connections between the data and Line wire pairs 306 and 122, and therefore enabling DATA service signalling between the DSLAM 106 and a modem at the customer premise;

isolating the DATA service signalling from the PSTN wire pair 116, and therefore preventing interference with POTS signalling in either the PSTN wire pair 116 or the main distribution frame; and protecting the low-pass filter 432 and the DSLAM 106 from surges due to lightning strikes, for example.

As may be appreciated, the plug-in module 408 may be configured to perform any desired combination of functions. For example, in some examples, the plug-in module 408 may be configured to provide surge protection only, in which case the PCB 436 and low-pass filter 470 may be omitted. In another example, the plug-in module 408 may be configured to provide a splitting function only, in which case the surge arrestors 416 and 422 may be omitted. In still further alternative embodiments, the PCB 436 may be configured with circuits other than filtering (such as a low-pass filter 470) so as to perform other signal processing functions, as desired. For example, the PCB 436 may be configured with testing or probing circuits, to enable a technician to test the local loop connections and diagnose problems.

Figure 5:
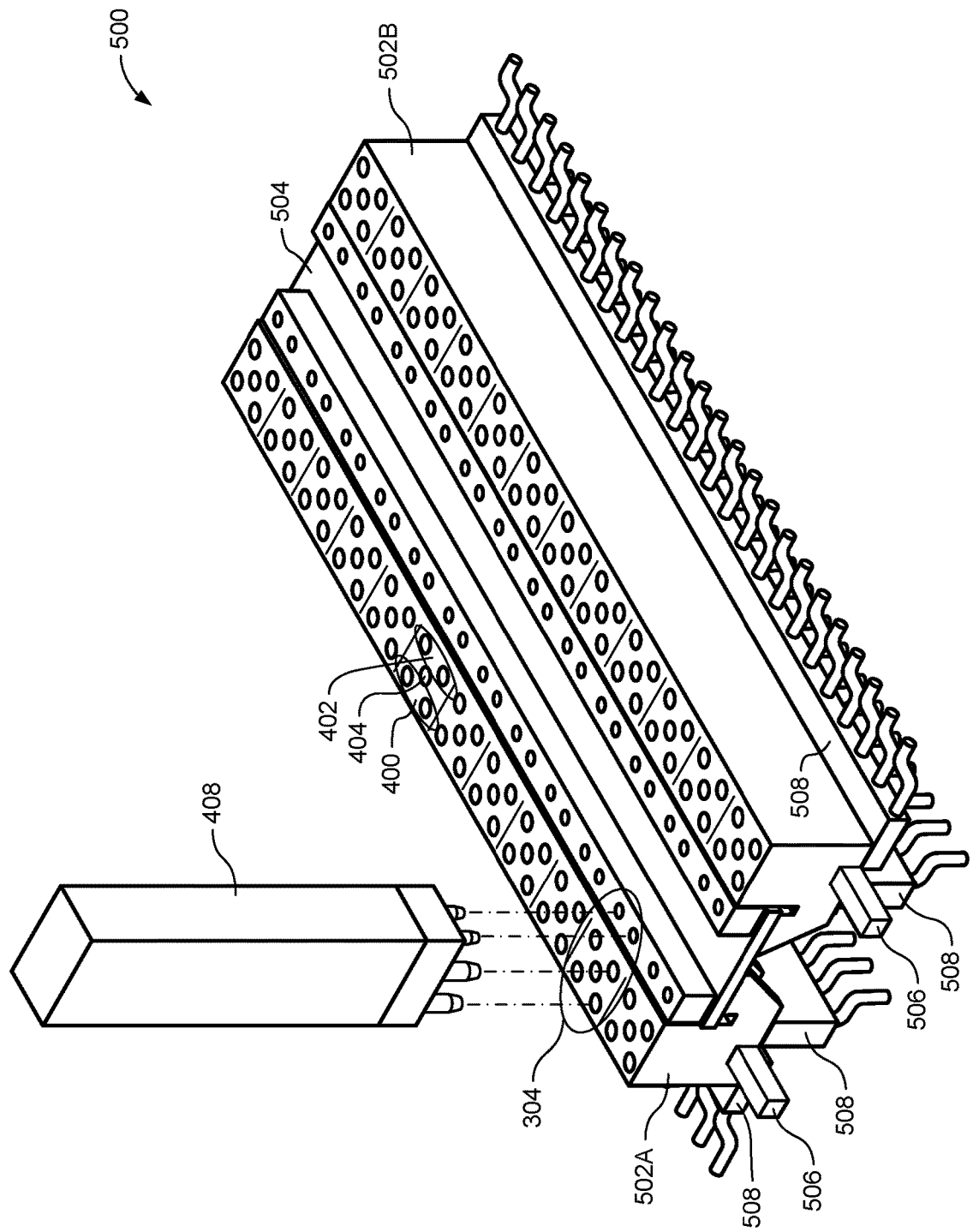
FIG. 5 illustrates an example interface module usable in the connection panel of FIG. 3.

FIG. 5 illustrates an example interface module 500. In some embodiments, the integrated interface panel 302 may be composed of one or more interface modules 500. In the example of FIG. 5, the interface module 500 includes a total of 24 sockets 304, and so is capable of supporting 24 local loop connections between the main distribution frame and customer premised demarcation points. If desired, interface modules including fewer or more than 24 sockets 304 may be used.

Figure 6:
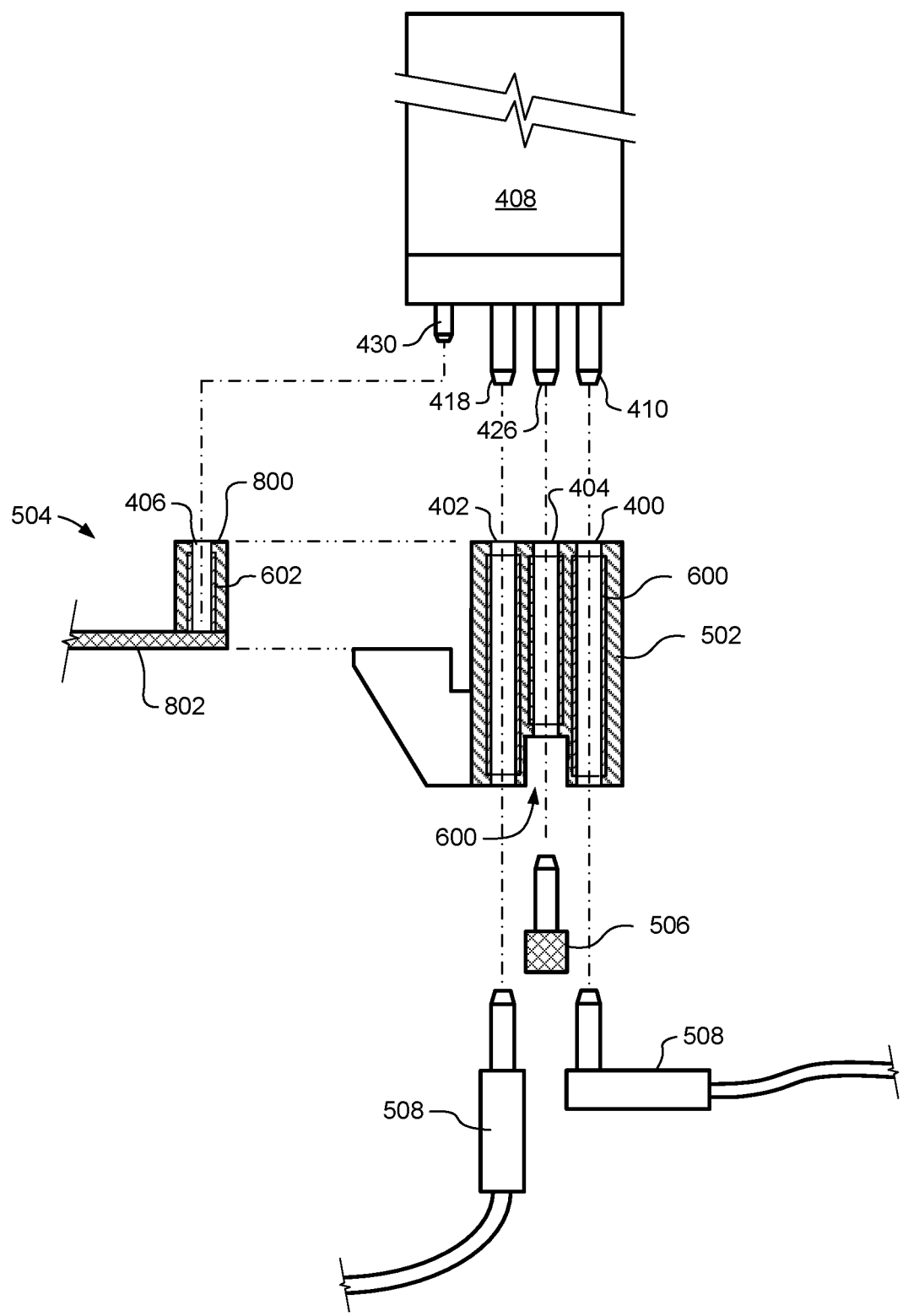
FIG. 6 is a partial cross-section view showing elements of the example interface module of FIG. 5.

As may be seen in FIG. 5, the interface module 500 comprises a pair of opposed base interface blocks 502A, 502B and a data interface block 504, as well as a ground bar 506 and a pair of connector modules 508 associated with each base interface block 502A, 502B. FIG. 6 is a partial cross-sectional view showing connections between the principle elements of the interface module 500, while FIGS. 7-10 illustrate each of the principle elements of the interface module 500 more clearly.

Referring to FIGS. 5-7, the base interface blocks 502A, 502B define the PSTN and Line socket ports 400 and 402 and the ground port 404 of each socket 304. Thus, the socket ports 400, 402 and 404 of each base interface blocks 502 are configured to receive the pins 410, 418 and 426 of a plug-in module 408. The base interface blocks 502A, 502B may provide the primary structural members of the interface module 500, and may include support tabs 700 for receiving and supporting the data interface block 504. In specific embodiments, the base interface blocks 502A, 502B may also include tangs and/or detents (not shown) for affixing the interface module 500 to a frame (not shown) of the Line Protection Panel 302. As may be best seen if FIG. 6, in the illustrated embodiment the socket ports 400, 402 and 404 of each base interface blocks 502 are provided as through-ports configured to receive corresponding pins of the ground bar 506 and connector modules 508. For example, each port may be provided with a generally tubular metal contact 600 having one end configured to receive (and make an electrical contact with) with a pin of a plug-in module 408, while the other end is configured to receive (and make an electrical contact with) a pin of a ground rail 506 or a connector module 508. If desired, other configurations may be used. For example, the metal contact 600 may have one end configured to receive (and make an electrical contact with) with a pin of a plug-in module 408, while the other end is configured as an IDC connector (not shown).

Preferably, Insulation Displacement Contact (IDC) connections (not shown in FIG. 6) are used to connect the wires of each of the PSTN and Line wire pairs 116 and 122 and the corresponding ports 400, 402 of a given base interface block 502. The use of IDC connections has advantages over conventional wire wrapping techniques in that IDC connections are less labour intensive and suffer from lower crosstalk. In order to ensure that wires remain attached to the IDC connections under surge conditions, a clip-on cover may be used to effectively clamp wires in place in the IDC connections.

Referring to FIGS. 5 and 8, the data interface block 504 generally comprises a pair of data headers 800 mounted on a PCB 802, and a connector 804 mounted on an underside of the PCB 802 as may be seen in FIG. 8B. Each data header 800 includes a respective pair of data ports 406 for each socket 304. Thus, in the illustrated embodiment, each data port 406 of the data header 800 is configured to receive data pins 430 of a plug-in module 408, and includes a metal contact 602 (FIG. 6) having one end adapted to make electrical contact with the data pin 430 and another end adapted to electrically connect to a circuit trace of the PCB (for example by means of a solder connection). The PCB 802 may be secured (eg by any suitable means including adhesives, fasteners such as screws or rivets, or latches) to the support tabs 700 of a pair of base interface blocks 502. The PCB 802 may include circuit traces connecting each port 406 of each data header 800 to a corresponding contact of the connector 804. Example connector types usable as the connector 804 include RJ-21 connectors, wire to board connectors, and high density D-SUB connectors. The connector 804 is preferably configured to connect to a corresponding set of data ports of the DSLAM 106, either directly or via a suitable jumper cable.

FIGS. 8A and 8B illustrate an example embodiment in which the connector 804 is located in a central portion of the PCB 802, on the opposite side of the PCB 802 from the two data headers 800. FIG. 8C illustrates an alternative embodiment in which the connector 804 is located at an end of the PCB 802 and on the same side of the PCB 802 as the two data headers 800. Interface modules 500 using either or both of these variants may be used in a given Line Protection Panel 302, as desired.

Referring to FIG. 9, the ground bar 506 may conveniently be provided as a plurality of pins 900 electrically connected to a conductor rail 902, for example by brazing, welding, press-fit or riveting. In some embodiments, at least the conductor rail 902 may be composed of brass or copper. In specific embodiments, the conductor rail 902 may include one or more contact points (not shown) configured to make electrical contact with a grounded portion of the Line Protection Panel 302. Such a grounded portion may, for example, include a wire connected to a ground potential, or a frame of the Line Protection Panel 302 which is itself connected to a ground potential. Preferably, the pins 900 are configured to insert into the ground ports 404 of a base interface module 502 so as to provide a path to ground for the ground pin 426 of a plug-in module 408. In the illustrated embodiment, the underside of the base interface module 502 includes a groove 600 (FIG. 6) sized to receive the conductor rail 902. This groove 600 is beneficial in that it provides additional clearance for the connector modules 508.

FIGS. 5, 6 and 10 illustrate two variants of the connector modules 508, which may be used interchangeably, as desired. In each variant, the connector module 508 includes a plurality of pins 1000, each of which is electrically connected to a respective wire 1002. A housing 1004 provides structural support and secures the pins 1000 at an appropriate spacing so that they can be inserted into the ports 400 and 402 of a base interface module 502. Any suitable method may be used to connect each pin 1000 to its respective wire 1002. In the illustrated embodiments, IDC connections are used. For example, FIGS. 10A and 10B illustrate an embodiment in which the pin 1000 is connected (for example, by brazing, welding, press-fit or riveting) to a metal connector 1006 which is configured to provide a double IDC connection to a wire 1002. The use of a double IDC connection is beneficial in that is provides a more robust mechanical connection that more securely retains the wire 1002 in the event of an overvoltage surge. A free end of the wires 1002 may be spliced to PSTN and Line wires 116 and 122, or may be coupled to a suitable connector (such as, for example, RJ-21 connectors, MS² connectors, 710 connectors, and high density D-SUB connectors), as desired. FIGS. 10B and 10C illustrate a variant of the connector modules 508 which is largely identical to that of FIGS. 10A and 10B, except that the pin 1000 extends longitudinally to the connector 1006.

As noted above, the plug-in module 408 can be configured to provide any desired combination of electrical connectivity and signal processing functions. In Specific embodiments, the circuit traces on the Printed Circuit Board (PCB) 436 may include any desired circuit connections between the contact points 444, 452, 460, 468 and the respective metal contacts 432 and 434 connected to the pair of Data pins 430. For example, in a simple "pass-through" embodiment, the PCB 436 may comprise circuit traces defining direct connections between the contact points 444 and 452, and between the contact points 460 and 468. This arrangement electrically connects the Tip and Ring wires of the PSTN wire pair 116 to the corresponding Tip and Ring wires of the Line wire pair 122, thereby enabling POTS signalling between the distribution frame and the customer premise. In such embodiments, the PCB 436 may not include any circuit traces connecting to the metal contacts 432 and 434, in which case the plug-in module 408 may not support data signalling. FIGS. 11A-12C illustrate a pair of specific embodiments of the plug-in module 408, in which the PCB 436 does not include any circuit traces connecting to the metal contacts 432 and 434, and so is omitted.

Figure 11A:
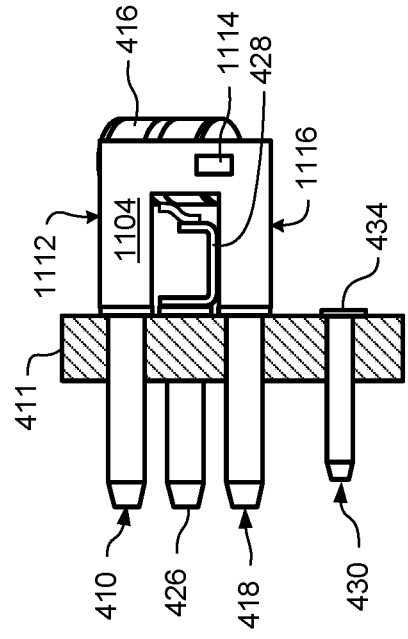
FIGS. 11A-11C schematically illustrate elements of a plug-in module insertable in the socket of FIG. 4A, in accordance with another representative embodiment.
Figure 11B:
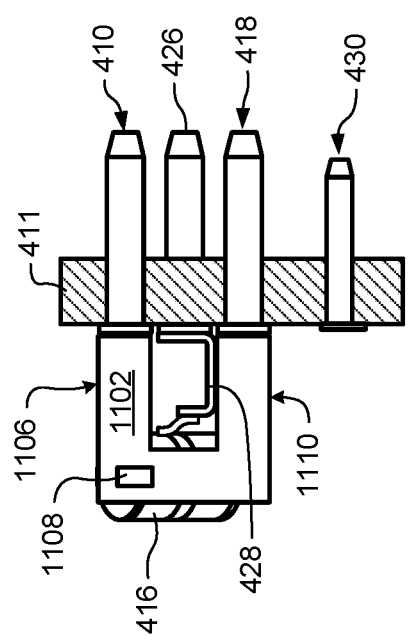
Figure 11C:
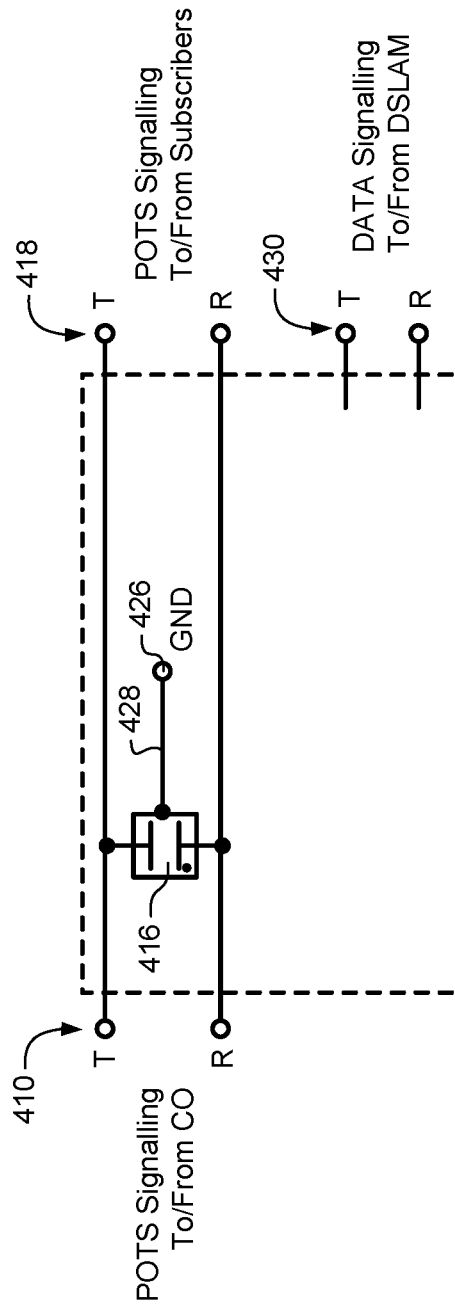

FIGS. 11A-11C illustrates a specific pass-through embodiment of the plug-in module 408, configured to support POTS signalling only, between the distribution frame and the customer premise. FIGS. 11A and 11B show respective left and right side views, and FIG. 11C schematically illustrates the electrical connections within the example pass-through embodiment. As may be seen in FIGS. 11A and 11B, the metal contacts 412, 414, 420 and 422 are replaced by generally U-shaped metal contacts 1102 and 1104 which are connected to the pins 410, 418 associated with the PSTN and Line wire pairs 116, 122. For example, metal contact 1102 includes a respective first leg 1106 extending between a mounting point 1108 for surge arrester 416 and a respective one of the pair of PSTN pins 410, and a respective second leg 1110 extending between the mounting point 1108 and a corresponding one of the pair of Line pins 418. Similarly, metal contact 1104 includes a respective first leg 1112 extending between a mounting point 1114 for surge arrester 416 and the other one of the pair of PSTN pins 410, and a respective second leg 1116 extending between the mounting point 1114 and a corresponding one of the pair of Line pins 418. This embodiment, provides a pass-through function between the PSTN and Line wire pairs 116, 122, thereby enabling POTS signalling between the distribution frame and the customer premise. Optional surge protection is provided on the connections between the PSTN and Line wire pairs 116, 122, but the PCB 436 and corresponding connections to the pair of Data pins 430 are omitted.

FIGS. 12A-12C illustrate another specific pass-through embodiment of the plug-in module 408, configured to support Data signalling only, between the DSLAM and the customer premise. FIGS. 12A and 12B show respective left and right side views, and FIG. 12C schematically illustrates the electrical connections within the example pass-through embodiment. As may be seen in FIGS. 12A and 12B the metal contacts 412, 414, 420 and 422 are replaced by generally U-shaped metal contacts 1202 and 1204 which are connected to the pins 418 and 430 respectively associated with the Line wire pair 122 and jumper wire pair 306 to a data port 110 of the DSLAM 106. For example, metal contact 1202 includes a respective first leg 1206 extending between a mounting point 1208 for surge arrester 420 and a respective one of the pair of Line pins 418, and a respective second leg 1210 extending between the mounting point 1208 and a corresponding one of the pair of Data pins 430. Similarly, metal contact 1204 includes a respective first leg 1212 extending between a mounting point 1214 for surge arrester 420 and the other one of the pair of Line pins 418, and a respective second leg 1216 extending between the mounting point 1214 and a corresponding one of the pair of Data pins 430. This embodiment, provides a pass-through function between the jumper wire pair 306 and the Line wire pair 122, thereby enabling Data signalling between the DSLAM and the customer premise. Surge protection is provided on the connections between the Line wire pair 122 and jumper wire pair 306, but the PCB 436 and corresponding connections to the pair of PSTN pins 410 are omitted.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A plug-in module for use in conjunction with an interface panel including at least one socket, the plug-in module comprising:
   three pairs of pins configured to electrically engage corresponding pairs of ports of a selected socket; and
   a pair of first contacts, each first contact including:
   a first leg defining an electrical connection between a selected one of a first pair of pins and a mounting point associated with a surge arrester, the first leg being configured to absorb surge currents between the selected one of the first pair of pins and the surge arrester;
   a second leg defining an electrical connection between the first leg and at least one of a contact point of a printed circuit board;
   each first contact being configured to structurally support at least the first leg and the surge arrester such that surge currents through the first leg are isolated from the at least one of the contact point of the printed circuit board and a selected one of a second pair of pins;
   a ground pin configured to electrically engage a corresponding ground port of the selected socket; and
   a ground contact defining an electrical connection between the surge arrester and the ground pin;
   wherein the second leg defines an electrical connection between the first leg and the contact point of the printed circuit board, and wherein the ground contact is configured such that surge currents through the ground contact are isolated from the printed circuit board;
   a pair of second contacts, each second contact including:
   a third leg defining an electrical connection between a selected one of the second pair of pins and a mounting point associated with a second surge arrester, the third leg being configured to absorb surge currents between the selected one of the second pair of pins and the second surge arrester; and
   a fourth leg defining an electrical connection between the third leg and a second contact point of the printed circuit and
   each second contact being configured to structurally support at least the third leg and the second surge arrester such that surge currents through the third leg are isolated from the second contact point of the printed circuit board.

2. The plug-in module as claimed in claim 1, wherein the ground contact further defines an electrical connection between the second surge arrester and the ground pin.

3. The plug-in module as claimed in claim 1, wherein the printed circuit board comprises circuit traces electrically connected to the third pair of pins.

* * * * *